(12) United States Patent
Russakoff et al.

(10) Patent No.: US 9,386,759 B2
(45) Date of Patent: Jul. 12, 2016

(54) EQUINE COOLING BODY TOWEL

(71) Applicants: Robert Evan Russakoff, Jacksonville, FL (US); Jennifer Morrison Campbell, Jacksonville, FL (US)

(72) Inventors: Robert Evan Russakoff, Jacksonville, FL (US); Jennifer Morrison Campbell, Jacksonville, FL (US)

(73) Assignee: EQUI COOL DOWN, INC., Jacksonville, FL (US)

( * ) Notice: Subject to any disclaimer, the term of this patent is extended or adjusted under 35 U.S.C. 154(b) by 0 days.

(21) Appl. No.: 14/167,168

(22) Filed: Jan. 29, 2014

(65) Prior Publication Data

US 2015/0208611 A1    Jul. 30, 2015

(51) Int. Cl.
*B68C 5/00* (2006.01)
*A01K 13/00* (2006.01)

(52) U.S. Cl.
CPC ............. *A01K 13/008* (2013.01); *A01K 13/006* (2013.01); *B68C 5/00* (2013.01); *B68C 2005/005* (2013.01)

(58) Field of Classification Search
CPC ...... A01K 13/008; A01K 13/006; B68C 5/00; B68C 1/12; B68C 2005/005; A41D 13/0015; A41D 1/04; A41D 1/00; A41D 13/00; A41D 13/0053; A61F 7/02; A61F 2007/0001; A61F 7/00; A61F 7/0097
See application file for complete search history.

(56) References Cited

U.S. PATENT DOCUMENTS

| | | | | |
|---|---|---|---|---|
| 2,072,188 A | * | 3/1937 | Tauber | 54/66 |
| 2,826,169 A | * | 3/1958 | Le Veen | 54/79.4 |
| 3,584,436 A | * | 6/1971 | Gulyas | 54/79.3 |
| 5,031,418 A | * | 7/1991 | Hirayama | A61F 7/10 62/457.2 |
| 5,145,906 A | * | 9/1992 | Chambers et al. | 524/732 |
| 5,175,986 A | * | 1/1993 | Farley | 54/44.1 |
| 5,984,855 A | * | 11/1999 | DiNapoli | 600/15 |
| 6,050,067 A | * | 4/2000 | Knight et al. | 54/44.6 |
| 6,125,616 A | * | 10/2000 | Brown | 54/66 |
| 6,421,989 B1 | * | 7/2002 | Leson | 54/66 |
| 7,219,486 B1 | * | 5/2007 | Conforth | 54/66 |
| 7,238,196 B2 | * | 7/2007 | Wibaux | A61F 13/02 607/152 |
| 2005/0126134 A1 | * | 6/2005 | Hathcock | 54/79.2 |
| 2007/0005037 A1 | * | 1/2007 | Mansfield | A61F 13/15203 604/385.3 |
| 2007/0289557 A1 | * | 12/2007 | Gerdes | 119/850 |
| 2008/0040839 A1 | * | 2/2008 | Gordon | 2/455 |
| 2010/0050958 A1 | * | 3/2010 | Jackson et al. | 119/850 |
| 2010/0146914 A1 | * | 6/2010 | MacDonald | 54/79.1 |
| 2011/0154604 A1 | * | 6/2011 | Chang | 15/244.4 |
| 2013/0337175 A1 | * | 12/2013 | Grussing | C04B 24/2641 427/256 |

FOREIGN PATENT DOCUMENTS

| | | | | |
|---|---|---|---|---|
| DE | 2613776 | * | 10/1977 | B68C 1/12 |
| DE | 19937878 A1 | * | 2/2001 | B68C 5/00 |
| FR | 2180243 | * | 11/1973 | B68C 1/12 |
| GB | 2440709 | * | 2/2008 | B68C 1/12 |
| WO | WO 2014044605 A1 | * | 3/2014 | B68C 1/12 |

* cited by examiner

*Primary Examiner* — Kathleen Alker
(74) *Attorney, Agent, or Firm* — Mark Young, P.A.

(57) ABSTRACT

A highly absorbent PVA/starch towel cools an animal through the process of evaporative cooling. The towel is textured with indentations. A ridge extends along the crest of the towel. Water is applied to and absorbed by the towel. The towel is held to the animal with elastic straps, which allow the towel to be flapped periodically while fastened to the animal. Periodic flapping brings more absorbed liquid to the towel surface to facilitate continued evaporative cooling.

18 Claims, 6 Drawing Sheets

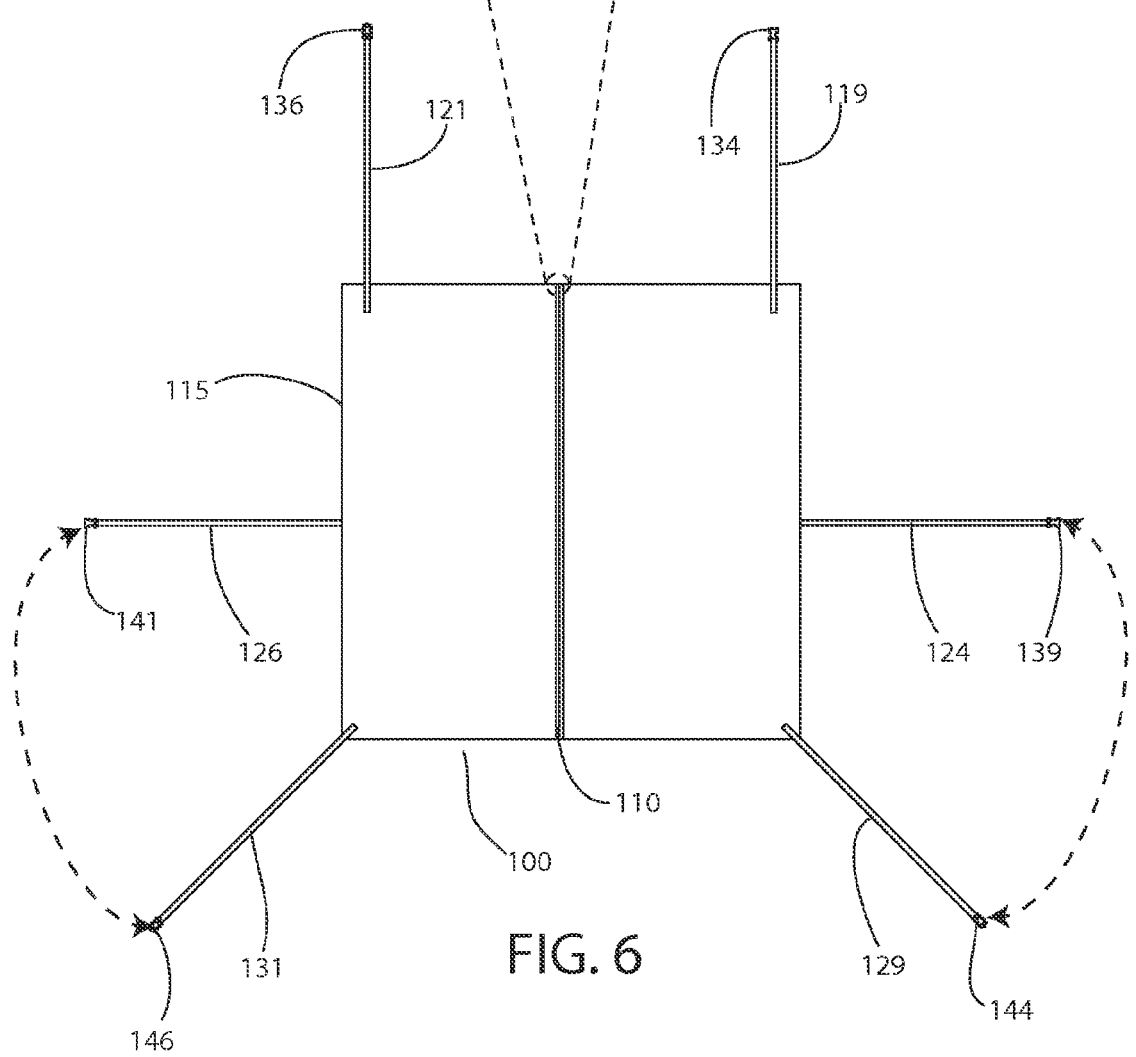

EQUINE COOLING BODY TOWEL

FIELD OF THE INVENTION

This invention relates generally to large animals such as horses, and more particularly, to a device for efficiently cooling a large animal.

BACKGROUND

Heat can adversely affect a horse's health and well-being. Heat stress in horses can cause weight loss, high body temperatures, low performance expectations, dramatic water intake, anhidrosis, and, eventually, potentially fatal ailments such as heat stroke. As the progression from mild stages of trouble to a final life threatening stages can be quick, it is critical to intervene immediately when the risk of heat stress loom large. As it is impractical and expensive to air-condition most horse stables, other heat reducing solutions must be implemented, such as showering a horse in cool water or applying a cooling device. Unfortunately, a shower is not always practical and many prior art cooling devices require ice or other chilled media, complex pumps and plumbing for circulating a cooling fluid, or electronic heat transfer equipment that requires a power source and a heat dump. For example, a Peltier heat pump produces a temperature gradient when current is supplied across dissimilar metals. While useful for temporary cooling a small localized area, such a heat pump is notoriously inefficient and wholly impractical for halting the downward spiral of an overheated horse.

What is needed is a reliable cooling device that is easy to use, reliable, does not require pumps or electric power, is capable of maintaining a safe body temperature, and is capable of quickly reducing the temperature of a horse at risk of heat stress.

The invention is directed to overcoming one or more of the problems and solving one or more of the needs as set forth above.

SUMMARY OF THE INVENTION

To solve one or more of the problems set forth above, in an exemplary implementation of the invention, an absorbent towel according to principles of the invention cools an animal, through the process of evaporative cooling, to avoid heat stress. The towel is comprised of one or more highly absorbent polymeric sheets, with a ridge and elastic straps. The polymeric sheets are comprised of polyvinyl alcohol (PVA) and starch, preferably wheat starch, in a ratio by weight of PVA to starch of 70:30 to 40:60. The sheets are textured with indentations to small air pockets between an animal and portions of the sheet. Water is applied to and absorbed by the towel. Then the towel is vigorously flapped before applying to the animal. Vigorous flapping helps bring absorbed water to the surface of the towel to facilitate evaporative cooling at the surface of the product. Latent heat drawn from the air and animal causes evaporation. A ridge provides air space and a fulcrum for flapping while the towel is on an animal. The elastic straps allow the towel to be flapped periodically while fastened to the animal. Periodic flapping brings more absorbed liquid to the towel surface to facilitate continued evaporative cooling. In this manner, with periodic flapping, the towel may remain cool for several hours while worn by the animal.

The exemplary evaporative cooling towel for a horse according to principles of the invention includes a water absorbent polymeric sheet sized to substantially cover the back and at least portions of the left and right sides of a horse coextensive with the covered back. The covered sides may be the flanks of the horse. The towel may also cover a portion of the loin of the horse. The water absorbent polymeric sheet includes a blend of polyvinyl alcohol (e.g., product grade PVA powder) and plant starch, with at least thirty percent (preferably about 50%) by weight of the blend being plant starch (e.g., wheat starch powder). The water absorbent polymeric sheet includes a front edge, a rear edge opposite the front edge, a first side edge, and a second side edge opposite the first side edge, and an average thickness.

A plurality of releasable elastic straps are attached to the water absorbent polymeric sheet for securing the sheet to a horse when the elastic straps are fastened. The elastic straps, which are substantially unstretched when the sheet is covering the back and left and right sides of the horse, stretch (e.g., by about 50% or more) to allow outward movement of the left and right side covering portions of the sheet away from the horse while the elastic straps are fastened. This stretching followed by release, causes the sides of the sheet to flap, which facilitates continued evaporative cooling. This flapping may be performed periodically, to maximize the cooling effect and duration.

A buckle assembly is provided for each of the plurality of releasable elastic straps. The buckle assembly enables fastening and release of each of the plurality of releasable elastic straps.

In one embodiment, an elongated ridge is provided on the water absorbent polymeric sheet, extending from the inner surface of the water absorbent polymeric sheet, facing towards the back of the horse, extending from the front edge to the rear edge of the water absorbent polymeric sheet. The elongated ridge is at least as thick as the average thickness of the water absorbent polymeric sheet. The elongated ridge may comprise a stitched seam.

In another embodiment, the water absorbent polymeric sheet includes a textured surface. The textured surface includes a plurality of spaced apart compressed regions having a compressed thickness that is less than the average thickness of the water absorbent polymeric sheet. The plurality of spaced apart compressed regions may include a plurality of platen pressed indentations, such as concave dimples. The texture facilitates circulation and cooling.

BRIEF DESCRIPTION OF THE DRAWINGS

The foregoing and other aspects, objects, features and advantages of the invention will become better understood with reference to the following description, appended claims, and accompanying drawings, where:

FIG. 5 is a magnified profile view of an exemplary ridge of an equine cooling body towel according to principles of the invention; and FIG. 6 is a plan view of an exemplary equine cooling body towel according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An absorbent towel according to principles of the invention cools an animal, through the process of evaporative cooling, to avoid heat stress. The towel is comprised of one or more highly absorbent polymeric sheets, with a ridge and elastic straps. Water is applied to and absorbed by the towel. Then the towel is vigorously flapped before applying to the animal. Vigorous flapping helps bring absorbed water to the surface of the towel to facilitate evaporative cooling at the surface of the product. Latent heat drawn from the air and animal causes evaporation. A ridge provides air space and a fulcrum for flapping while the towel is on an animal. The elastic straps allow the towel to be flapped periodically while fastened to the animal. Periodic flapping brings more absorbed liquid to the towel surface to facilitate continued evaporative cooling. In this manner, with periodic flapping, the towel may remain cool for several hours while worn by the animal.

Figure 1:
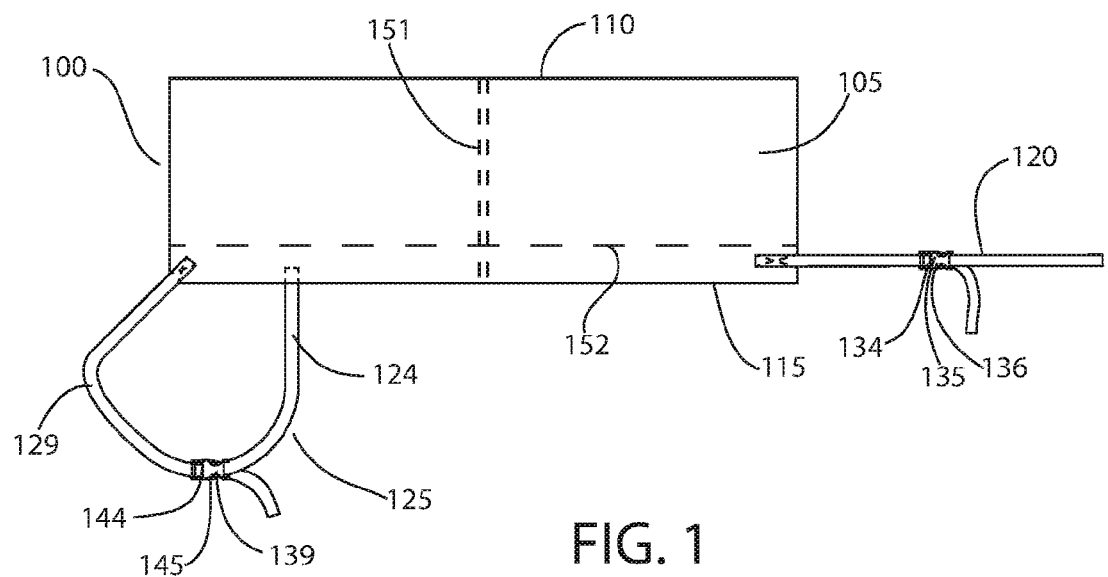
FIG. 1 is a side view of an exemplary equine cooling body towel according to principles of the invention.
Figure 2:
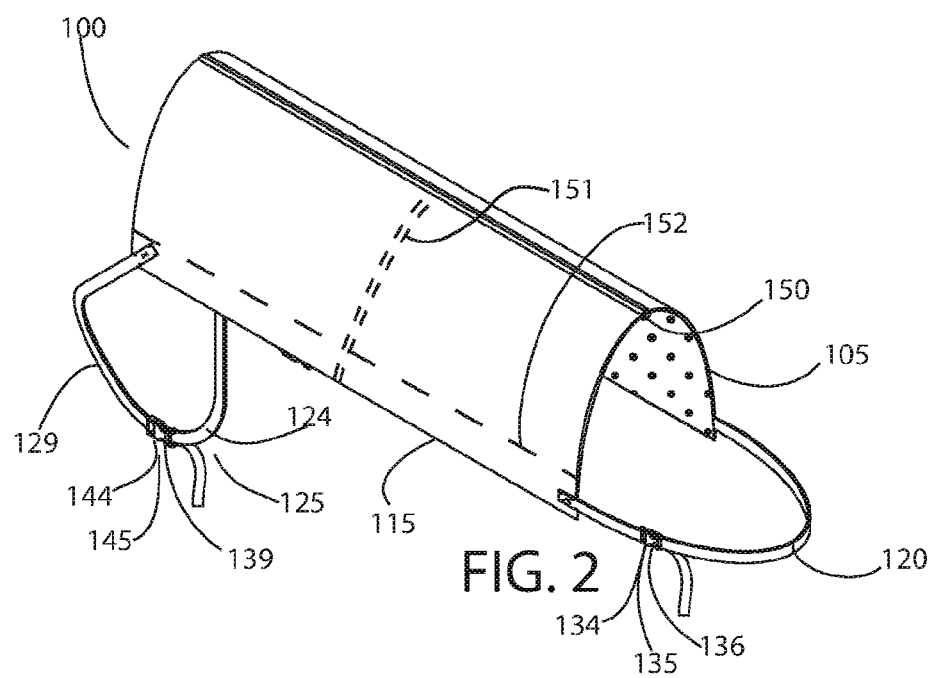
FIG. 2 is a first perspective view of an exemplary equine cooling body towel according to principles of the invention.
Figure 3:
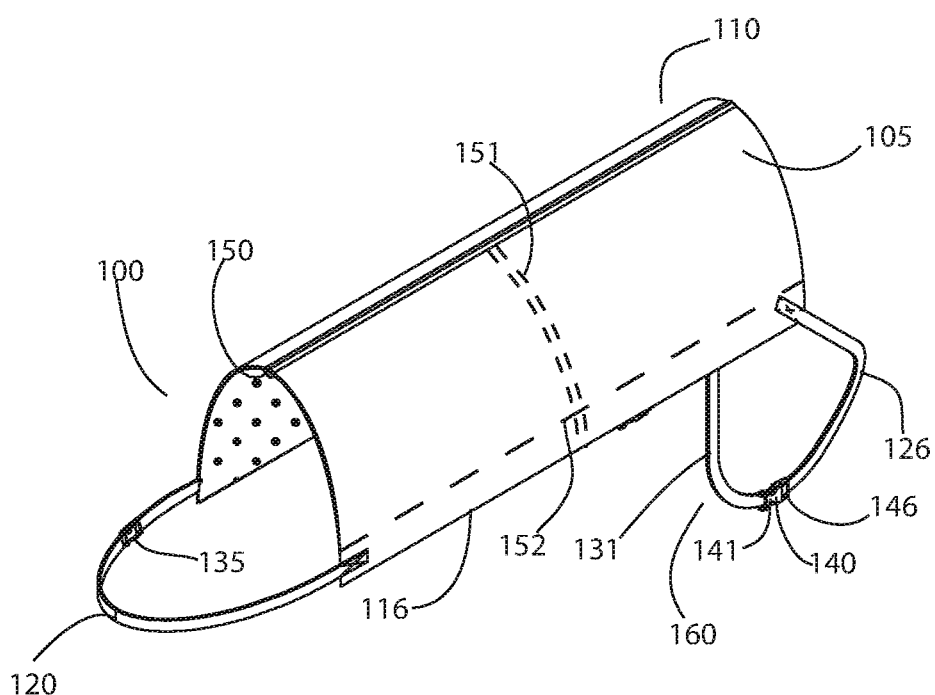
FIG. 3 is a second perspective view of an exemplary equine cooling body towel according to principles of the invention.

Referring to FIGS. 1 through 3, various views of an exemplary equine cooling body towel 100 are conceptually illustrated. The towel is comprised of polymeric waterabsorbent textured sheets 105. A ridge 150 is provided at the underside of the top 110 of the towel 100. Alternatively, the ridge 151 may be provided at the underside from side to side of the towel 100. Optionally, more than one ridge may be provided. The plurality of ridges may be perpendicular or parallel or arranged otherwise. A plurality of straps 120, 125 160 with buckle assemblies 135, 140, 145 are provided to enable attachment to a horse.

Figure 7:
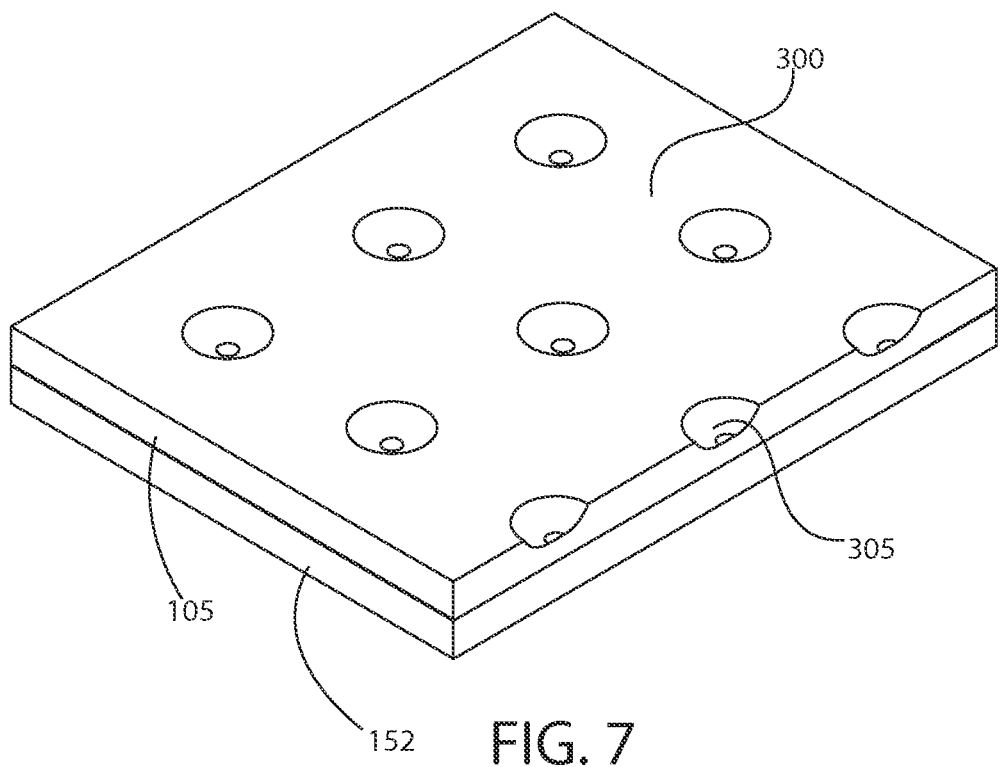
FIG. 7 is a perspective view of a small isolated portion of an exemplary textured equine cooling body towel according to principles of the invention.

The towel 100 may be comprised of a single sheet or a plurality of sheets joined together by stitching, bonding or otherwise. In an exemplary embodiment, each sheet is comprised of polyvinyl alcohol and starch. By way of example and not limitation, the sheet may be made by blending polyvinyl alcohol and starch in hot water at about 100° C. to 200° C., preferably about 150° C., until a substantially homogeneous solution is achieved. The polymeric sheets are comprised of a blend of polyvinyl alcohol (PVA) and starch, preferably wheat starch, with about 30 to 70 percent by weight starch, with about 50 to 60 percent by weight starch being preferred. The PVA may be product grade PVA 17-99 (L) powder. The starch may be wheat starch powder with a fineness of at least a 99% passing rate through a 100-mesh sieve. Sheets may be prepared by casting the homogenous solution in trays with porous bottoms. The castings are allowed to dry. After drying, the sheets are removed from the trays. Then the sheets undergo surface processing. Such processing includes stamping dimples or other texture into the sheet using a press and textured platen, which may be heated. Such dimple like impressions 305 are conceptually illustrated in the small segment 300 of sheet material 105 in FIG. 7. Several sheets may be stitched together to form the towel 100.

The towel includes at least one ridge 150 on the underside of the towel 100, such as at the top 110 of the towel 100. The underside is the side that will face the animal. The ridge 150 extends along the length of the towel 100. Alternatively, the ridge 151 may be provided at the underside from side to side of the towel 100. Optionally, more than one ridge may be provided. The plurality of ridges may be perpendicular or parallel or arranged otherwise. The ridge 150 serves a few purposes. It maintains a slight gap between the animal and towel and provides a fulcrum for periodically flapping the towel to prolong evaporative cooling. The gap facilitates ventilation and circulation while preventing the blanket from sticking to the animal.

While one ridge 150 and alternate ridge 151 are shown in the Figures, additional ridges may be provided without departing from the scope of the invention. For example, one or more ridges may be provided along each side flap of the towel facing the animal.

Each ridge 150, 151 comprises a protrusion extending from the towel surface facing the animal. In one embodiment, the ridge 150, 151 comprises folded overlapping and abutting folded edges of adjoining sheets stitched together into a seam, as conceptually illustrated in the magnified profile view of FIG. 5. The overlapping and abutting edges are stitched together in a manner that forms an elongated hump-like protrusion. In another embodiment, piping may be applied as a ridge. The piping may be comprised of the same material as the sheet 105 or another material. In a preferred embodiment, the ridge thickness, t, is at least as thick as the sheet.

A reinforcement strip 152 may be provided along edges and seams. By way of example, a reinforcing fabric, such as nylon webbing or cloth, may be stitched or otherwise affixed to one or more edges or seams. The reinforcement strip 152 prevents tearing of the towel material when the straps are pulled. When the towel is laden with water, and the straps are pulled, substantial tension is produced. Without the reinforcement, tearing is likely where the straps attach.

The towel 100 is sized to cover or substantially cover the back, loin, and at least portions of the flanks of a horse. By way of example and not limitation, a four-feet by four-feet or larger towel 100 may be utilized within the scope of the invention. In a particular embodiment the towel is about five feet by five feet and made of several stitched together sheets. However, the invention is not limited to any particular size, so long as the towel is sized to cool a substantial portion of a horse. The thickness of the towel when dry may be between about 1/64 to 1/8 of an inch, with a thickness of about 1/32 inch being preferred. When the towel is wet, the thickness may swell.

Figure 4:
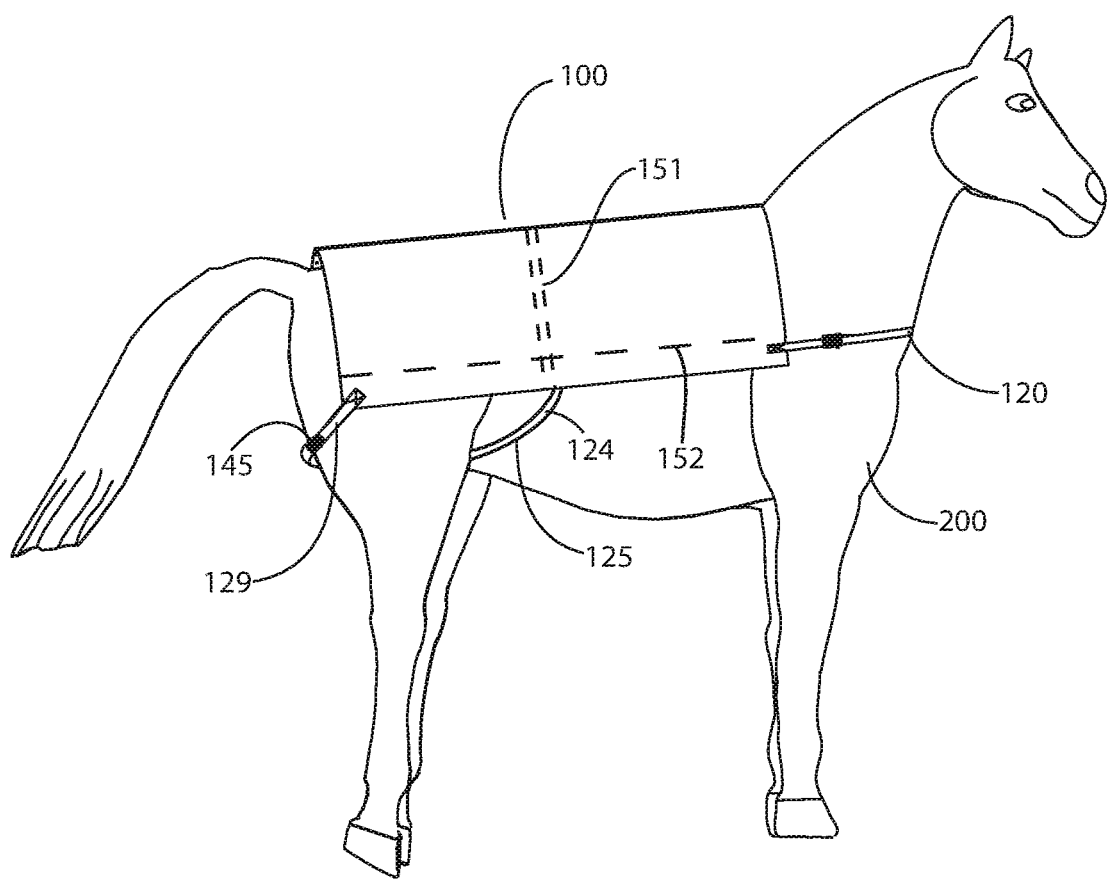
FIG. 4 is a side view of an exemplary equine cooling body towel on a horse according to principles of the invention.

Neck and hip straps 120, 125, 160, respectively, secure the towel to an animal 200, as conceptually illustrated in FIG. 4. The straps 120, 125, 160 are elastic. Nonlimiting examples of suitable elastic straps are elastic woven webbing, such as nylon or polyester, that allows approximately 50% or more elongation of the strap. The neck strap 120 faces the horse's head. The hip straps 125, 160 extend around the hip of the horse at an angle (e.g., an acute angle such as a 45° degree angle relative to the sides of the towel).

The straps 120, 125, 160 are sized to allow substantial elastic extension when the towel is attached to a horse. Thus, each strap is sized to attach the towel 100 to the animal 200 without appreciable stretching. In this manner, air spaces between the towel 100 and animal are maintained. Stretching of the straps is important to allow waving and flapping of the sides of the towel while it is worn by a horse. To flap the sides of the towel 100, the bottom edges 115, 116 of the towel are gripped and drawn swiftly away from the animal and then released. Similar gripping and movements may accomplish the same objective. The elastic straps 120, 125, 160 allow such movement. Such flapping facilitates continued evaporative cooling.

The straps are comprised of separate strap segments joined at or near free ends by a buckle. Ends attached to the towel are attached by stitching. The straps may be attached to the outward facing side or the inward facing side of the towel. Strap segments 119 and 121 are joined by male and female buckle segments 134, 136 to form strap 120. Segments 124 and 129 are joined by male and female buckle segments 139, 144 to form strap 125. Segments 126 and 131 are joined by male and female buckle segments 141, 146 to form strap 160. One or both segments of each pair of segments comprising a strap may be elastic.

A buckle 135, 140, 145 or clasp is provided for fastening two loose ends of strap segments to form each strap 120, 125, 150. As shown in FIG. 6, in an exemplary embodiment, each buckle 135, 140, 145 includes a male buckle component 134, 141, 144 and a female buckle component 136, 139, 146. The male buckle component 134, 141, 144 includes flexible members (e.g., spring arms). The female buckle component 136, 139, 146 has an opening to receive the flexible members of the male buckle component 134, 141, 144, and one or more top or side holes which allow the flexible members to return to their undeflected state and lock the components together until the flexible members are deflected for release. This sort of buckle may be found on backpacks, belts, rifle slings, boots. At least one of the buckle components is adjustable to allow the strap to be sized to properly fit an animal by sliding the adjustable member along the length of the corresponding strap segment.

In use, the towel is sprayed, splashed or submerged in water so that a substantial amount of water is absorbed. Then the towel is flapped or shaken to help initiate the evaporative cooling process. Then the towel is placed upon the back, loin and flanks of an animal such as a horse. Then the strap segments are joined together with buckles. The straps should be adjusted in length so that the straps are not appreciably stretched when buckled. Periodically, such as every 15 to 30 minutes, the towel may be sprayed with a light mist of water and then the sides of the towel may be flapped by grabbing the sides and quickly pulling away from the animal and then releasing the sides. Such flapping facilitates further evaporative cooling. Without such flapping, the initial cooling effect would simply wane. The elastic straps enable such flapping while the towel is worn by the animal. The ridge and texture facilitate cooling and air circulation.

Figure 8:
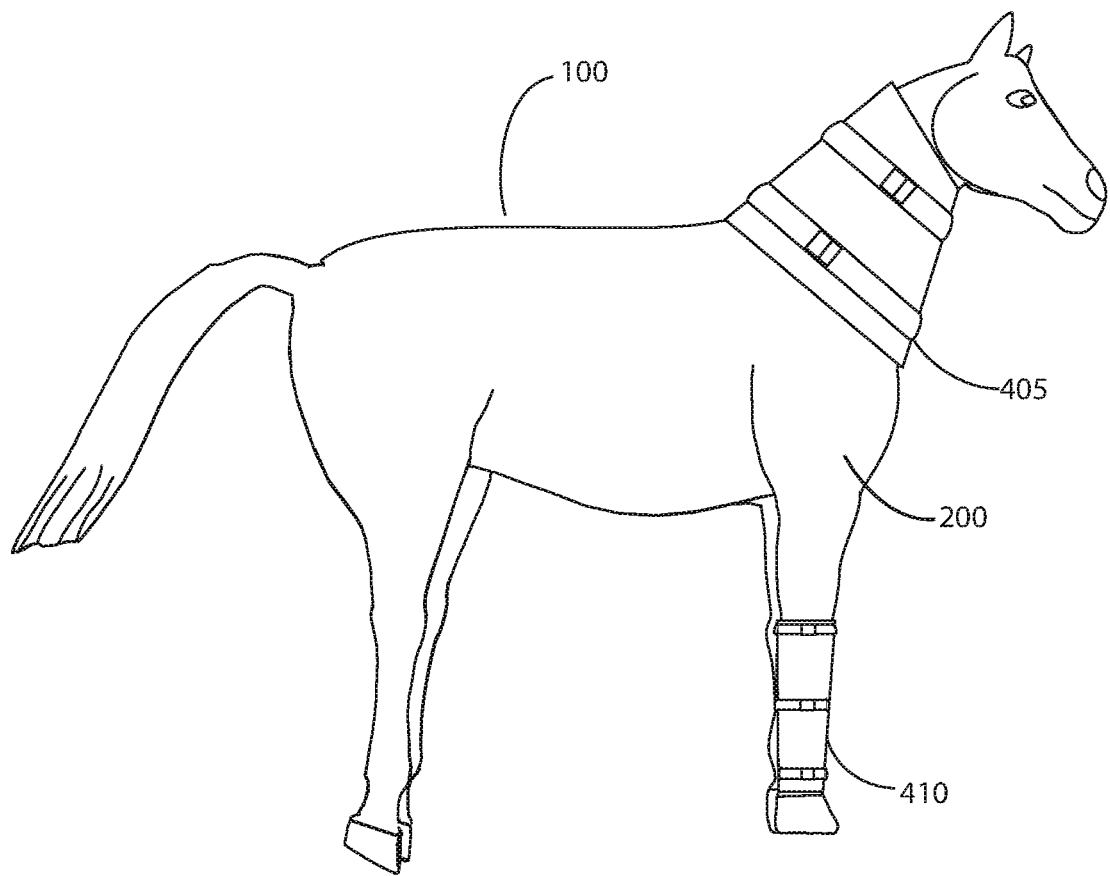
FIG. 8 is a side view of a horse with neck and leg wraps according to principles of the invention.

In another embodiment, the towel and straps may be scaled and configured for attachment to a limb, extremity or other body part capable of being wrapped. By way of example and not limitation, neck 405 and leg 410 wraps, as shown in FIG. 8, are feasible and come within the scope of the invention. In each such case, the towel has the composition described above and the straps are substantially elastic to allow periodic flapping of the towel.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. An evaporative cooling towel for a horse, said horse having a back, left and right sides coextensive with the back, a barrel, shoulders and thighs, said evaporative cooling towel comprising: a water absorbent polymeric sheet sized to substantially cover the back and at least portions of the left and right sides of the horse coextensive with the covered back, said water absorbent polymeric sheet comprising a blend of polyvinyl alcohol and plant starch, with at least thirty percent by weight of the blend being plant starch, said water absorbent polymeric sheet including a front edge, a rear edge opposite the front edge, a first side edge, and a second side edge opposite the first side edge, and an average thickness; and a plurality of fabric reinforcement strips; and a plurality of elastic straps attached to the water absorbent polymeric sheet for securing the sheet to the horse when the elastic straps are fastened, said elastic straps being substantially unstretched when the sheet is covering the back and left and right sides of the horse, and said elastic straps stretching to allow outward movement of portions of the sheet covering the left and right sides of the horse, said outward movement being movement away from the horse and effective for facilitating continued evaporative cooling, while the elastic straps are fastened; a buckle assembly for each of the plurality of elastic straps, said buckle assembly enabling fastening and release of each of the plurality of releasable elastic straps; and said evaporative cooling towel further comprising an elongated ridge on said water absorbent polymeric sheet, said ridge extending downwardly from said water absorbent polymeric sheet, from one of the front edge, the rear edge, the first side edge and the second side edge, to the opposite of the front edge, the rear edge, the first side edge and the second side edge of the water absorbent polymeric sheet.

2. The evaporative cooling towel for a horse according to claim 1, said water absorbent polymeric sheet comprising the blend of polyvinyl alcohol and plant starch, with about fifty percent by weight of the blend being plant starch.

3. The evaporative cooling towel for a horse according to claim 1, said plant starch comprising wheat starch powder.

4. The evaporative cooling towel for a horse according to claim 3, said polyvinyl alcohol comprising product grade PVA powder.

5. The evaporative cooling towel according to claim 4, said elongated ridge having a thickness that is at least the average thickness of the water absorbent polymeric sheet.

6. The evaporative cooling towel according to claim 5, said elongated ridge comprising a stitched seam.

7. The evaporative cooling towel according to claim 6, said water absorbent polymeric sheet including a textured surface, said textured surface including a plurality of spaced apart compressed regions having a compressed thickness that is less than the average thickness of the water absorbent polymeric sheet.

8. The evaporative cooling towel according to claim 7, the plurality of spaced apart compressed regions comprise a plurality of platen pressed indentations.

9. The evaporative cooling towel according to claim 8, the plurality of platen pressed indentations comprising a plurality of concave dimples.

10. The evaporative cooling towel according to claim 1, each of said plurality of elastic straps having an unstretched length, and each of said plurality of elastic straps having a maximum stretched length that is at least 50% greater than the unstretched length.

11. The evaporative cooling towel according to claim 1, each of said plurality of elastic straps having an unstretched length, and each of said plurality of elastic straps having a maximum stretched length that is at least about 50% greater than the unstretched length.

12. An evaporative cooling towel on a horse, said horse having a back, left and right sides coextensive with the back, a barrel, shoulders and thighs, said evaporative cooling towel comprising: a water absorbent polymeric sheet sized to substantially cover the back and at least portions of the left and right sides of the horse coextensive with the covered back, said water absorbent polymeric sheet comprising a blend of polyvinyl alcohol and plant starch, with at least thirty percent by weight of the blend being plant starch, said water absorbent polymeric sheet including a front edge, a rear edge opposite the front edge, a first side edge, and a second side edge opposite the first side edge, and an average thickness, and said water absorbent polymeric sheet containing absorbed water, heat from said horse contributing to evaporation of said water, and evaporation of said water causing a cooling effect; a plurality of releasable elastic straps attached to the water absorbent polymeric sheet for securing the sheet to a horse when the elastic straps are fastened, said elastic straps being substantially unstretched when the sheet is covering the back and left and right sides of the horse, and said elastic straps stretching to allow outward movement of portions of the sheet covering the left and right sides of the horse, said outward movement being movement away from the horse effective for facilitating continued evaporative cooling, while the elastic straps are fastened, said outward movement facilitating continued evaporation of said water from said water absorbent polymeric sheet; a buckle assembly for each of the plurality of releasable elastic straps, said buckle assembly enabling fastening and release of each of the plurality of releasable elastic straps;

said evaporative cooling towel on the horse further comprising an elongated ridge on said water absorbent polymeric sheet, said ridge extending downwardly from said water absorbent polymeric sheet, from one of the front edge, the rear edge, the first side edge and the second side edge, to the opposite of the front edge, the rear edge, the first side edge and the second side edge of the water absorbent polymeric sheet.

13. The evaporative cooling towel on a horse according to claim 12, wherein said polyvinyl alcohol comprises polyvinyl alcohol powder and said plant starch comprises wheat starch, with about fifty percent by weight of the blend comprising wheat starch.

14. The evaporative cooling towel on a horse according to claim 13, said water absorbent polymeric sheet including a textured surface, said textured surface including a plurality of spaced apart compressed regions having a compressed thickness that is less than the average thickness of the water absorbent polymeric sheet.

15. The evaporative cooling towel on a horse according to claim 14, the plurality of spaced apart compressed regions comprise a plurality of platen pressed indentations.

16. The evaporative cooling towel on a horse according to claim 15, the plurality of platen pressed indentations comprising a plurality of concave dimples.

17. The evaporative cooling towel on a horse according to claim 12, each of said plurality of elastic straps having an unstretched length, and each of said plurality of elastic straps having a maximum stretched length that is at least about 50% greater than the unstretched length.

18. An evaporative cooling towel for an animal, said animal having a body with a plurality of portions, said evaporative cooling towel comprising: a water absorbent polymeric sheet sized to substantially cover one of the portions of the animal's body, said water absorbent polymeric sheet comprising a blend of polyvinyl alcohol and plant starch, with at least thirty percent by weight of the blend being plant starch, said water absorbent polymeric sheet including a front edge, a rear edge opposite the front edge, a first side edge, and a second side edge opposite the first side edge, and an average thickness; and a plurality of elastic straps attached to the water absorbent polymeric sheet for securing the sheet to the animal when the elastic straps are fastened, said elastic straps being substantially unstretched when the sheet is covering the back and left and right sides of the animal, and said elastic straps stretching to allow outward movement of portions of the sheet covering the left and right sides of the animal, said outward movement being movement away from the animal effective for facilitating continued evaporative cooling, while the elastic straps are fastened; a buckle assembly for each of the plurality of elastic straps, said buckle assembly enabling fastening and release of each of the plurality of releasable elastic straps;

said evaporative cooling towel for the animal further comprising an elongated ridge on said water absorbent polymeric sheet, said ridge extending downwardly from said water absorbent polymeric sheet, from one of the front edge, the rear edge, the first side edge and the second side edge, to the opposite of the front edge, the rear edge, the first side edge and the second side edge of the water absorbent polymeric sheet.

* * * * *